United States Patent [19]

Thornburg

[11] 4,056,823
[45] Nov. 1, 1977

[54] ANALOG CHART RECORDER EMPLOYING THERMAL PRINTING MEANS

[75] Inventor: David D. Thornburg, Los Altos, Calif.

[73] Assignee: Xerox Corporation, Stamford, Conn.

[21] Appl. No.: 747,165

[22] Filed: Dec. 3, 1976

[51] Int. Cl.² .................... G01D 15/10; H05B 3/20; H01C 3/08
[52] U.S. Cl. .................... 346/76 R; 219/216; 338/217
[58] Field of Search ............ 346/76 R, 136; 219/216, 219/243, 388 R, 388 W, 388 C; 338/217, 218

[56] References Cited

U.S. PATENT DOCUMENTS

| | | | |
|---|---|---|---|
| 2,005,108 | 6/1935 | Pudelko | 346/30 |
| 2,653,126 | 9/1953 | Greig | 346/76 R X |
| 2,662,803 | 12/1953 | Schwartz | 346/76 R X |
| 3,377,599 | 4/1968 | Reis | 346/76 R X |
| 3,506,804 | 4/1970 | Schippers et al. | 338/217 X |
| 3,921,119 | 11/1975 | Caddock | 338/217 |
| 4,006,414 | 2/1977 | Parker | 324/106 |

*Primary Examiner*—George H. Miller, Jr.
*Attorney, Agent, or Firm*—M. J. Colitz; T. J. Anderson; Leonard Zalman

[57] ABSTRACT

An analog chart recorder is provided having a heater assembly which includes a tapered, electrically resistive element that develops a non-uniform temperature profile on electrical energization along its length. A substrate is provided under the resistive film which is in thermal contact with the film. A heat sink in thermal contact with the substrate provides that the temperature distribution will achieve steady state. Means are provided for advancing a heat sensitive medium past and in contact with the heater assembly thus providing the analog chart recorder.

6 Claims, 5 Drawing Figures

ANALOG CHART RECORDER EMPLOYING THERMAL PRINTING MEANS

BACKGROUND OF THE INVENTION

This invention relates generally to analog chart recorders employing thermal printing means and more specifically to such chart recorders having a stationary writing component utilizing tapered resitor devices.

It is known that conventional analog chart recording instruments as presently configured are typically bulky, expensive and subject to easy mechanical damage. Typical such chart recorders include a paper drive system which moves chart paper at a prescribed rate in the x direction. A writing instrument positioned in operative association therewith such as an ink pen is then placed on the paper and driven along a path in the y direction. The pen is normally driven by mechanical linkages in such a direction and magnitude as to correspond to the polarity and magnitude of the electrical signal being measured.

With the advent of tapered resistor technology more specifically defined in U.S. Ser. No. 747,167 filed concurrently herewith which is hereby respectfully incorporated by reference, it is now been discovered that this technology may be employed in a novel fashion to provide new and improved analog chart recorders.

Generally described in the above recited application a device comprising a tapered resistor element which develops a non-uniform temperature profile on electrical energization is interacted after being energized with selected heat sensitive media to provide a number of very useful effects and devices which may be employed in a great many applications with ease, simplicity and greater economy than heretofore possible including the above recited recorder. The intrinsic simplicity and low cost of this device opens new areas of applicability for such analog measuring equipment as well as having utility in existing applications.

Typically a resistive device is seen to be a resistive film having a uniform thickness which has been formed into a resistor of a specified width and length. This film is then placed on an insulating substrate which is bonded to a heat sink. When an electrical current I is passed through the resistor the production of Joule heat causes a steady state temperature above ambient $\Delta T$ which, if thermal fringing effects are neglected, may be theoretically defined by the relationship $$\Delta T = \frac{d_s I^2 \rho_s}{K_s W^2} \quad \text{(Eq. 1)}$$

in which $d_s$ and $K_s$ are respectively the thickness and thermal conductivity of the substrate and $\rho_s$ is the sheet resistivity of the resistive material measured in ohms/-square. (Note: $\rho_s = \rho/d$ where $\rho$ is the bulk resistivity of the resistive film.) It is readily seen from this illustration that since the width of the resistor is uniform, the local power dissipation and hence the temperature rise is also uniform so that no temperature gradient is established and the unique and utilizable effect of the device of the instant invention is not realized.

However, as is seen in FIG. 2 of U.S. Ser. No. 747,167, filed concurrently herewith, a device may be provided including a resistive film which significantly has a varying width in the horizontal plane while the thickness remains uniform. This film may be placed on an insulating substrate 2 which in turn is bonded to a heat sink 3. Now it is seen that the width of the resistive element 1 is a monotonically increasing function of position along the length of the element or in simple terms the resistor element is tapered. In the event the slope of the taper is gradual over distances comparable with the substrate thickness Equation 1 recited above will still be applicable for a first approximation. When a tapered resistor is energized the local power generation will vary along the length of the resistor so that points of prescribed temperature rise can be made to move along the tapered resistor by varying the current flowing through the device.

Although the non-uniformity of the width of the resistive film 1 may vary in any suitable fashion, it is assumed for purposes of this discussion that the taper is linear as is seen in FIG. 1 so that the following relationship is theoretically true: $w = w_o + bx \;\; \phi < x < 1$ (Eq.2) in which $w_o$ is the width at the narrow end of the taper, $b$ is the slope of the taper and $x$ is the distance along the resistor measured from the narrow end. Assuming that the tapered resistor element is in contact with for example, a thermographic substance which undergoes a color change when heated to the temperature T' or above as the current is increased in the tapered resistor a color line of $x'$ will be drawn. The length of this line may theoretically be derived as follows: the temperature diferential T' is defined as $\Delta T' = T'-T_{amb}$, where $T_{amb}$ is the ambient temperature. Combining Equations 1 and 2 yields the relationship between the applied current and the distance $x'$ over which the tapered resistor will be heated to temperature T' or above, i.e., $$x' = \frac{I\left(\frac{d_s \rho_s}{K_s \Delta T'}\right)^{\frac{1}{2}} - w_o}{b} \quad \text{(Eq. 3)}$$

It is seen that when $w_o$ is greater than 0 no region of the taper will be hotter than T' for currents given by $$I < \frac{w_o}{\left(\frac{d_s \rho_s}{K_s \Delta T'}\right)^{\frac{1}{2}}} \quad \text{(Eq. 4)}$$

A general description of the tapered resistor technology having been above described the application of such technology in the new and novel manner to produce analog chart recorders employing printing means including thermal printing means is now provided which is devoid of the hereinbefore recited deficiencies.

It is therefore an object of this invention to provide a novel analog chart recorder devoid of the above noted deficiencies.

It is a further object of this invention to provide an analog chart recorder having a stationary writing component.

Still another object of this invention is to provide an analog recorder employing thermal writing rather than wet ink writing processes.

Still another object of this invention is to provide a novel analog chart recorder which is simple, economical and may be employed and maintained with little maintenance.

These and other objects of the instant invention are accomplished generally speaking by providing a resistive film on a substrate which will support a temperature gradient along its length under an applied current the film being tapered. The resistive film on the substrate will heat up as current from a source is impressed through the contacts across the film. A heat sink is provided to establish that the temperature distribution will achieve steady state. It is approximated that the temperature at any point along the film will vary as $$T - T_{amb} = \frac{C\rho_s I^2}{w^2}$$

in which $T_{amb}$ is the ambient temperature, $c$ is a constant, $\rho_s$ is the sheet resistivity of the resistive film, I is the impressed current and $w$ is the width of the film at the point of interest. It is seen that for a linear tapered resistive film at any given current the temperature along the film decreases as a function of $w^{-2}$ and also that points of constant temperature rise move linearly with current along the film. The above described heater assembly is now brought into contact with a sheet of temperature sensitive material. When current is applied to the heater assembly a region of the resistive film will heat up above the threshold temperature needed for the heat sensitive material to respond in a visible or marking manner. This will result in the production of a mark whose length is proportional to the impressed current. If the paper now is allowed to advance at a constant rate past the substrate and the substrate is alternately raised and lowered between paper incrementing steps, a bar graph of the input function to the heater assembly will be plotted.

In an alternative embodiment of the system of the instant invention an apparatus for recording a single current reading is provided in which a heat sensitive card is inserted into a recorder base to a card stop. Ridges in the recorder base cause the card to be pressed against the resistive strip when the recorder lid is closed. Such a system allows single event recording. It should be noted that in order to compensate for misalignment of the card, scale markings can be printed on the card at the same time by using the stepped resistive film which will hereinafter be described in the figures.

The general system of the instant invention having been described hereinabove, the specifics of the instant invention will be more clearly understood with reference to the figures which follow of which:

Figure 3:
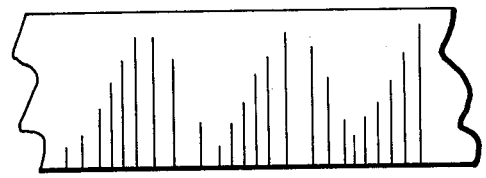

In FIG. 3 is seen a typical bar graph produced by the recorder assembly of the instant invention.

Figure 4:
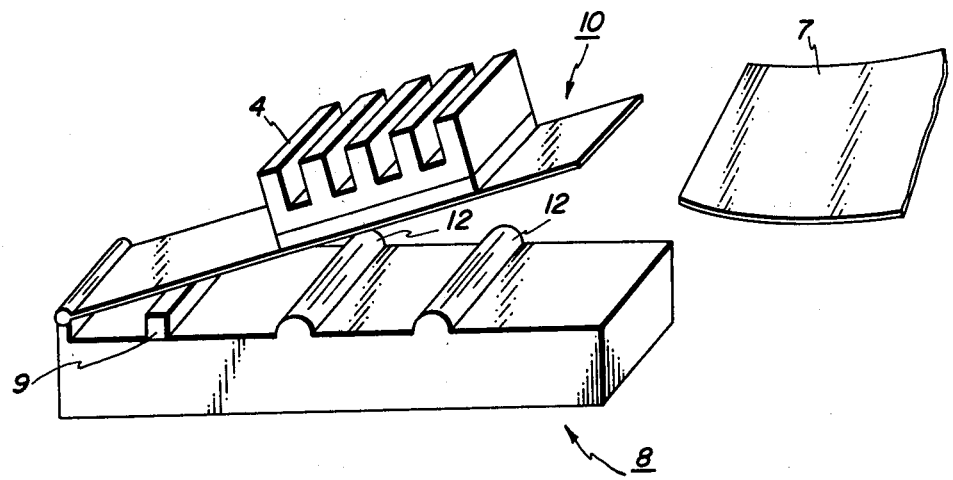

In FIG. 4 there is seen an alternative embodiment of the instant invention which provides for a recording of a single current reading.

Figure 5:
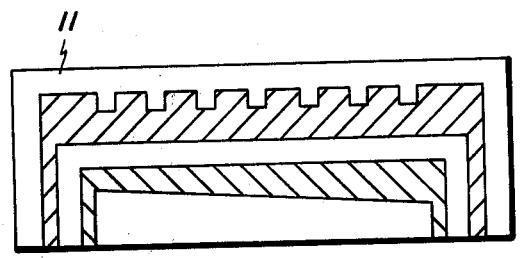

In FIG. 5 is seen a compensation mechanism for misalignment of the card employed in the mechanism of FIG. 4.

Figure 1:
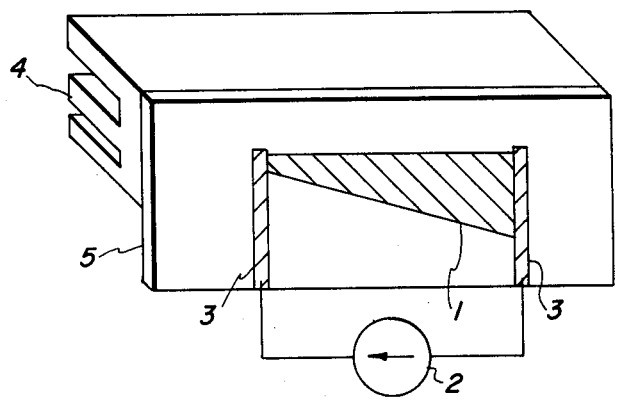
FIG. 1 represents a typical analog chart recorder employing the heater assembly described above.

In FIG. 1 is seen a resistive film 1 residing on a substrate 5 which is heated as current from a source 2 is applied through contacts 3. The heat sink 4 is provided to assure that the temperature distribution will achieve steady state. The temperature at any point across the film will vary in accordance with the equation which defines $T-T_{amb}$ formally recited.

Figure 2:
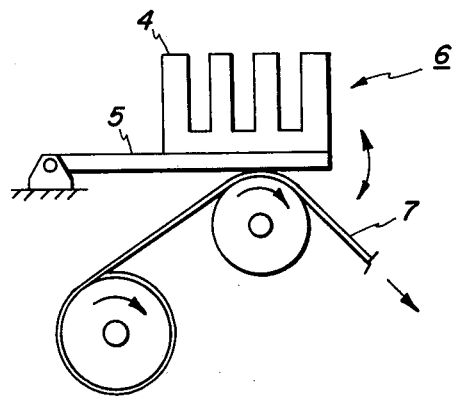
FIG. 2 represents a typical application of the recorder shown in FIG. 1 in a continuous marking mode utilizing heat sensitive paper.

In FIG. 2 the heater assembly of FIG. 1 is now brought into contact with a temperature sensitive paper. When current is applied to the heater assembly generally designated as 6 a region of the resistive film eventually heats up above the threshold temperature required for activating the heat sensitive paper and permanently marking it. This results in the production of a mark whose length is proportional to the impressed current on the paper 7. If the paper 7 is advanced at a constant rate past the substrate 5 and the substrate is alternately raised and lowered between paper incrementing steps, a bar graph will result which represents the input function to the heater as may be seen in FIG. 3.

In FIG. 3 is shown illustratively a typical bar graph which may be produced by the mechanism described in FIG. 2.

In FIG. 4 is seen a heat sensitive card 7 which can be inserted into a recorder base 8 to a card stop 9. The ridge as seen in the recorder base causes the card 7 to be pressed against the resistive strip not shown when the recorder lid is closed. This system as alluded to above provides an embodiment wherein the system of the instant invention provides single event recording.

In FIG. 5 is seen a mechanism which may be employed to compensate for any misalignment of the card as employed in FIG. 4. Scale markings may also be printed on a card simultaneously with the alignment process by using the stepped resistive film 11.

Any suitable resistive film may be employed in the recorder of the instant invention. Typical resistive films include chromium, nichrome and nickel thin films as well as laminated foils of nichrome (a 80 Ni 20 Cr alloy), monel (a Cu,Ni alloy), Inconel (an alloy of nickel and chromium) or stainless steel. Preferred of these are metal films comprising 80% nickel, 20% chromium which in addition to supplying the resistive characteristics required in the system of the instant invention are also wear resistant.

Any suitable substrate material may be employed in the system of the instant invention. Typical substrates include borosilicate glasses, ceramics, epoxy/glass composites, silicone rubbers, polyimides and polyethylene terephthalate.

Current may be applied to the system of the instant invention employing any suitable conventional method in addition to those described herein. The heat sink of the instant invention may comprise any suitable material. Typical materials include aluminum, copper, brass, nickel, iron, and chromium.

Any suitable temperature sensitive paper may be employed with the chart recorder of the instant invention. Typical such sensitive papers include "Teacher's Pet" NCR paper, 3M copy films, Carterfax paper, Thermofax paper, and paper used in Texas Instruments and Hewlett Packard thermal printers.

To further define the specifics of the present invention, the following examples are intended to illustrate and not limit the particulars of the present system. Parts and percentages are by weight unless otherwise indicated.

EXAMPLE I

A thermal analog recorder element is fabricated and tested in a preliminary fashion. The recorder is made by depositing a NiCr (8020 by weight) film to a sheet resistivity of 50Ω $^{-1}$ on clean glass 2 × 3 substrates. A pattern is etched into the NiCr film using photoresist exposed to the mask shown below. The resultant glass substrate has a tapered resistor between two outer contacts. The substrate is mounted in a socket and connected to a variac. As the voltage is increased on the variac, a sheet of Carterfax paper is pressed on the resistor film. This paper darkens when a certain temperature is exceeded. At a certain voltage the narrow end of the resistor will heat up enough to print on the paper. As more current flows at higher voltages, the printed line grows longer. The printed lines for three voltages are found to be irregularly shaped lines. No care is taken to effect good heat sinking on either the heater or the paper, so the line width is found to spread, but nonetheless it is clearly seen that increasing line length results from increasing voltage, thus the device is found to function as an analog recorder with no moving parts.

Although the present examples were specific in terms of conditions and materials used, any of the above listed typical materials may be substituted when suitable in the above examples with similar results. In addition to the steps used to carry out the system of the present invention, other steps or modifications may be used if desirable. In addition, other materials may be incorporated in the system of the present invention which will enhance, synergize, or otherwise desirably affect the properties of the systems for their present use.

Anyone skilled in the art will have other modifications occur to him based on the teachings of the present invention. These modifications are intended to be encompassed within the scope of this invention.

What is claimed is:

1. An analog chart recorder comprising a heater assembly said assembly comprising a tapered electrically resistive element which develops a non-uniform temperature profile on electrical energization along its length, a substrate which underlies said resistive film which is in thermal contact with said resistive film, a heat sink in thermal contact with said substrate which provides that the temperature distribution will achieve steady state, and means for advancing a heat sensitive media past and in contact with the heater assembly.

2. The device as defined in claim 1 wherein said substrate comprises one material selected from the group consisting of borosilicate glasses, ceramics, epoxy/glass composites, silicone rubbers, polyimides and polyethylene terephthalate.

3. The device as defined in claim 1 wherein said resistive element comprises one material selected from the group consisting of chromium, nickel, nickel chromium alloys, copper nickel alloys, and stainless steel.

4. The device as defined in claim 1 wherein said resistive element comprises acrylic based paints which are silver filled to the proper sheet resistivity.

5. The device as defined in claim 4 wherein said sheet resistivity is in a range of from about 0.1 to 1,000 ohms per square.

6. A recorder comprising a heater assembly, said assembly comprising a tapered electrically resistive element which develops a non-uniform temperature profile on electrical energization along its length, a substrate which underlies said resistive film which is in thermal contact with said resistive film, a heat sink in thermal contact with said substrate which provides that the temperature distribution will achieve steady state, means for advancing a heat sensitive media past and in contact with the heater assembly, and means for alternatively raising and lowering the substrate between incrementing steps.

* * * * *